United States Patent [19]

Kisanuki et al.

[11] Patent Number: 4,785,584
[45] Date of Patent: Nov. 22, 1988

[54] WEATHER STRIP FOR DOOR PANE OF MOTOR VEHICLE

[75] Inventors: Hisayuki Kisanuki; Jun Shibasaki, both of Aichi, Japan

[73] Assignee: Toyoda Goesi Co., Ltd., Nishikasugai, Japan

[21] Appl. No.: 52,970

[22] Filed: May 22, 1987

[30] Foreign Application Priority Data

Aug. 9, 1986 [JP] Japan .................. 61-187555

[51] Int. Cl.$^4$ .............................................. E06B 7/16
[52] U.S. Cl. ...................................................... 49/441
[58] Field of Search .................. 49/440, 441, 489, 488

[56] References Cited

U.S. PATENT DOCUMENTS

| | | | |
|---|---|---|---|
| 4,553,354 | 11/1985 | Barbero | 49/441 X |
| 4,616,446 | 10/1986 | Okamoto | 49/441 |
| 4,648,207 | 3/1987 | Shibasaki | 49/441 |
| 4,663,888 | 5/1987 | Okamoto | 49/441 |
| 4,704,820 | 11/1987 | Kisanuki | 49/441 |

FOREIGN PATENT DOCUMENTS 59-20721 2/1984 Japan .
61-85240 4/1986 Japan .

*Primary Examiner*—Philip C. Kannan
*Attorney, Agent, or Firm*—Cushman, Darby & Cushman

[57] ABSTRACT

A weather strip for the door pane of a motor vehicle in which the ends of front and rear vertical parts of the stripping are coupled to each other by a die molded portion. The stripping has a nearly U-shaped cross section such that a pane housing groove is defined by the inner, intermediate and outer walls of the stripping when it is fitted into a pane channel. Upper portions of the vertical parts of the stripping have an asymmetric cross section wherein at least the inner wall of the upper portion is provided with a curved seal lip extending toward the pane housing groove. Lower portions of the vertical parts of the stripping have a symmetric cross section such that both the inner and outer walls of the lower portion are provided with curved seal lips extending toward the pane housing groove. The inner and outer walls of the connecting die-molded portion are formed so that the curved seal lips of the die molded portion extending toward the pane housing groove are press-deformed and integrated with the inner and outer walls of the upper and lower portions of the respective vertical parts.

1 Claim, 2 Drawing Sheets

WEATHER STRIP FOR DOOR PANE OF MOTOR VEHICLE

BACKGROUND OF THE INVENTION

1. Field of the Invention

The present invention relates to weather stripping for the window pane of a motor vehicle, and particularly relates to portions of the stripping which couple the upper and lower portions of front and rear vertical stripping sections to each other.

2. Description of the Prior Art

As shown in FIGS. 3 and 4, a conventional weather strip 1 for the window pane of a front door D of a motor vehicle is constructed so that the upper ends of the front and rear vertical parts 2 and 3 of the weather strip are coupled to each other by the oblique pillar and roof part 4 thereof. The extruded upper and lower portions 11 and 21 of the vertical parts 2 and 3 are coupled to each other by die-molded portions 9. The oblique pillar and roof part 4 is extruded and coupled to the front and the rear vertical parts 2 and 3 by die-molded portions 6 and 7.

The cross section of each of the upper portions 11 is asymmetric. When each of the upper portions 11 is fitted in a pane channel C as shown in FIG. 5 or 6, a pane housing groove 15 is defined by the inner, intermediate and outer walls 12, 13 and 14 of the upper portion to make the cross section thereof nearly U-shaped. A curved seal lip 16 projects from the inner wall 12 into the pane housing grooves 15 to urge a door pane G outwards with regard to the motor vehicle. A nearly straight seal lip 17 projects from the outer wall 14 to hardly urge the pane G inwards with regard to the motor vehicle, or a curved small seal lip 18 projects from the outer wall 14 into the pane housing groove 15 to slightly urge the pane G inwards with regard to the motor vehicle. The seal lip 17 or 18 projecting from the outer wall 14 is caused to slightly urge the pane G inwards with regard to the motor vehicle. In this manner, the distance between the outer surface of the pane G and that of the sash S of the door D is minimized to reduce a wind noise and improve the appearance of the door (and also make the outer surfaces of the vehicle almost flush with each other).

On the other hand, the cross section of each of the lower portions 21 is symmetric. A pane housing groove 15 is defined by the inner, intermediate and outer walls 12, 13 and 14 of each of the lower portions 21 in the same manner as each of the upper portions 11, as shown in FIG. 7. Curved seal lips 26 having the same form as each other project from the inner and outer walls 12 and 14 of each lower portion 21 into the pane housing groove 15. Each lower portion 21 is provided with the symmetric cross section constituted by the walls 12, 13 and 14 and the curved seal lips 26 as described above. The pane G is held by the lower portion 21 and the lower portion is easily fitted in the pane channel C.

The die-molded portions 9 between the upper and the low portions 11 and 21, respectively, are shaped so that the cross-sectional form of each upper portion 11 including the seal lips 16 and 17 (or 18) is gradually changed into that of the corresponding lower portion 21. In other words, the die-molded portions 9 are constructed so that seal lips, which are located in sliding contact with the door pane G, project from the inner and outer walls of the die-molded portions.

As for the above-described construction, the pane contact surfaces of the seal lips (especially, the curved seal lips extending into the pane housing groove 15) of each die-molded portion 9 need to be subjected to a treatment such as urethane paint application and electrostatic hair planting in order to reduce the resistance to the sliding contact and enhance the anti-wearing durability of the pane contact surfaces. This results in increasing the number of manufacturing steps for the weather strip. That is a problem.

SUMMARY OF THE INVENTION

The upper ends of the front and rear vertical parts of weather stripping according to the present invention are coupled to each other by an oblique pillar and roof part. The upper and lower portions of each of the front and the rear vertical parts have an asymmetric and a symmetric cross section, respectively, and are coupled to each other by a die-molded portion. The weather strip is characterized in that the inner and outer walls of the die-molded portion are formed so that curved seal lips, which extend toward a pane housing groove, are press-deformed and integrated with the inner and outer walls.

DESCRIPTION OF THE PREFERRED EMBODIMENT

Embodiments of the present invention are hereafter described with reference to the drawings attached hereto. The embodiments are provided with the same symbols in FIGS. 1 and 2 as the above-described corresponding component portions and parts of the conventional weather strip.

Figure 1:
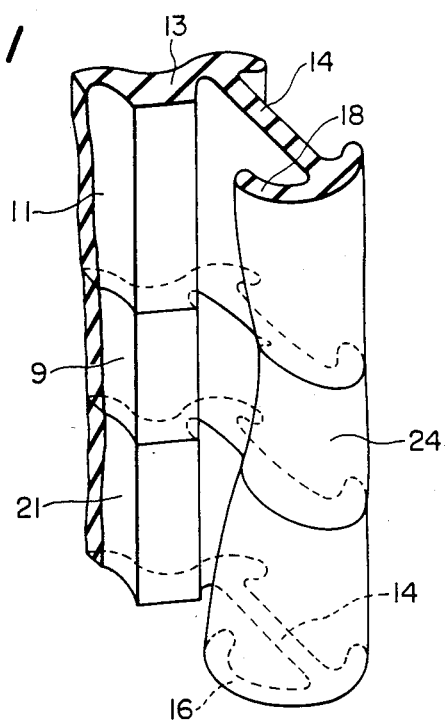
FIG. 1 shows a perspective partial view of a weather strip which is an embodiment of the present invention and shown in the drawing only at the die-molded portion of the vertical part of the weather strip and the vicinity of the die-molded portion.
Figure 6:
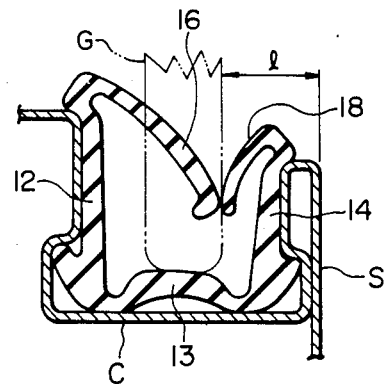
FIG. 6 shows a sectional view of the upper portion of the vertical part of another conventional weather strip.
Figure 7:
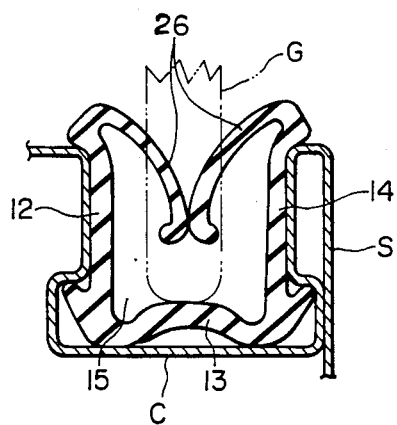
FIG. 7 shows a sectional view of the lower portion of the vertical part of a conventional weather strip.

The embodiment shown in FIG. 1 is a weather strip for the door pane of a motor vehicle. The weather strip comprises a die-molded portion 9, an upper portion 11 whose cross section is the same as that shown in FIG. 6, and lower portion 21 whose cross section is the same as that shown in FIG. 7. The outer wall 24 of the die-molded portion 9 is formed so that the small seal lip of the upper portion 11 and the seal lip 16 of the lower portion 21 are press-deformed and integrated with the outer walls 14 of the upper and the lower portions. The inner wall 12 (not shown in the drawings) of the die-molded portion 9 is also formed so that the seal lips 16 of the upper and the lower portions 11 and 21 are press-deformed and integrated with the inner walls 14 of the inner and the outer portions.

Figure 2:
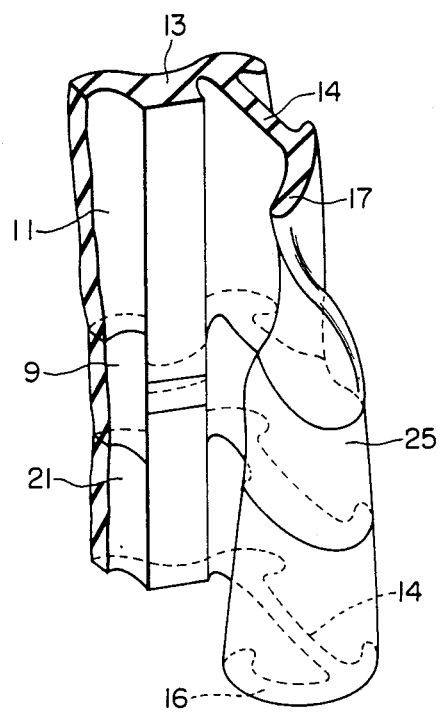
FIG. 2 shows a perspective partial view of a weather strip which is another embodiment of the present invention and shown in the drawing only at the die-molded portion of the vertical part of the weather strip and the vicinity of the die-molded portion.
Figure 3:
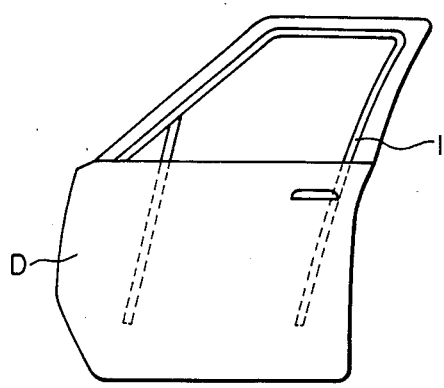
FIG. 3 shows a side view of the front door of a motor vehicle.
Figure 4:
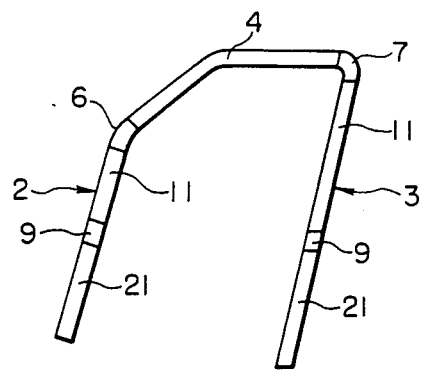
FIG. 4 shows a view of an entire weather strip which is fitted in the door shown in FIG. 3.
Figure 5:
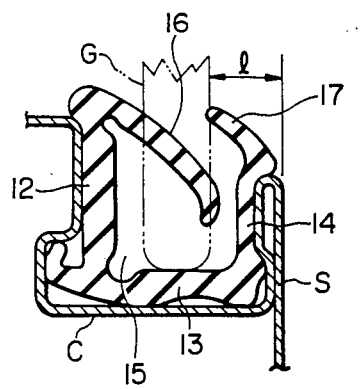
FIG. 5 shows a sectional view of the upper portion of the vertical part of a conventional weather strip.

FIG. 2 shows a perspective partial view of the other embodiment which is also a weather strip for door pane of a motor vehicle. The weather strip comprises a die-molded portion 9, an upper portion 11 whose cross section is the same as that shown in FIG. 5, and a lower portion 21 whose cross section is the same as that shown in FIG. 7. The outer wall 25 of the die-molded portion 9 is formed so that the seal lip 16 of the lower portion 21 is press-deformed and integrated with the outer wall 14 of the lower portion. Since the seal lip 17 of the upper portion 11 at the outer wall 14 thereof does not project into a pane housing groove 15, the seal lip 17 does not need to be press-deformed and coupled to the other wall but only needs to be coupled to the outer wall 25 of the die-molded portion 9. The inner wall 12 (not shown in the drawings) of the die-molded portion 9 is formed in the same manner as the above described weather strip so that the seal lips 16 of the upper and the lower portions 11 and 21 are press-deformed and integrated with the inner wall 12. In the weather strip shown in FIG. 2, the coupled length of the intermediate wall 13 of the die-molded portion 9 is set to be shorter than each of those of the inner and outer walls 12 and 14 thereof, in order to reduce the sliding resistance of the intermediate wall and lengthen the anti-wearing life thereof.

In the above-described embodiments, the die-molded portion 9 is manufactured usually by putting the upper and the lower portions 11 and 21 in both the lateral portions of a die and entering a rubber material into a cavity between the upper and the lower portions through transferring or injection.

Since the inner and outer walls 12 and 24 of the die-molded portion 9 of the above-described embodiment (weather strip) are formed so that the seal lips 16 and 18, which extend towards the pane housing groove 15 of the die-molded portion, are press-deformed and integrated with the walls 12 and 14 as described above, both the sides of the door pane G do not come into contact with the die-molded portion when the pane is moved up and down in the weather strip fitted in a panel channel. For that reason, the pane sliding contact surfaces of the seal lips 16 and 18 do not need to be subjected to a posterior treatment such as urethane paint application and electrostatic hair planting.

As described above, a weather strip is provided for the door pane of a motor vehicle in accordance with the present invention so that each of the front and rear parts of the weather strip comprises an upper portion whose cross section is asymmetric, and a lower portion whose cross section is symmetric, and the upper and the lower portions are coupled to each other by a die-molded portion. The inner and outer walls of the die-molded portion are formed so that curved seal lips, which extend toward a pane housing groove, are press-deformed and integrated with the inner and outer walls of the upper and the lower portions. As a result, the curved seal lips, the sliding resistance of each of which is higher than that of each of another seal lip and an intermediate wall which come into line contact with a pane, are substantially not present at the die-molded portion. For that reason, the pane sliding contact surface of the die-molded portion does not need to be subjected to a treatment such as urethane paint application and electrostatic hair planting in order to reduce the sliding resistance of the surface and enhance the anti-wearing durability thereof.

What is claimed is:

1. A weather strip for the door pane of a motor vehicle, comprising:
    upper and lower strip portions coupled to each other at respective lower and upper ends thereof;
    each of said upper and lower strip portions having a nearly U-shaped cross section such that a pane housing groove is defined by inner, intermediate and outer walls of said strip portions when said strip portions are fitted into a channel;
    a die-molded portion coupling said upper and lower strip portions to each other;
    said upper strip portion having an asymmetric cross section such that at least the inner wall of said upper portion is provided with a curved seal lip extending toward said pane housing groove; and
    said lower strip portion having a symmetric cross section such that both the inner and outer walls of said lower portion are provided with curved seal lips extending toward said pane housing groove,
    said die-molded portion having inner and outer walls formed so that said curved seal lips extend toward said pane housing groove and are press-deformed so as to integrate with the inner and outer walls of the upper and lower strip portions.

* * * * *